C. M. G. DELANO.
RESILIENT WHEEL.
APPLICATION FILED DEC. 13, 1915.

1,192,045.

Patented July 25, 1916.
2 SHEETS—SHEET 1.

Inventor
CHARLES M. G. DELANO
By Watson E. Coleman
Attorney

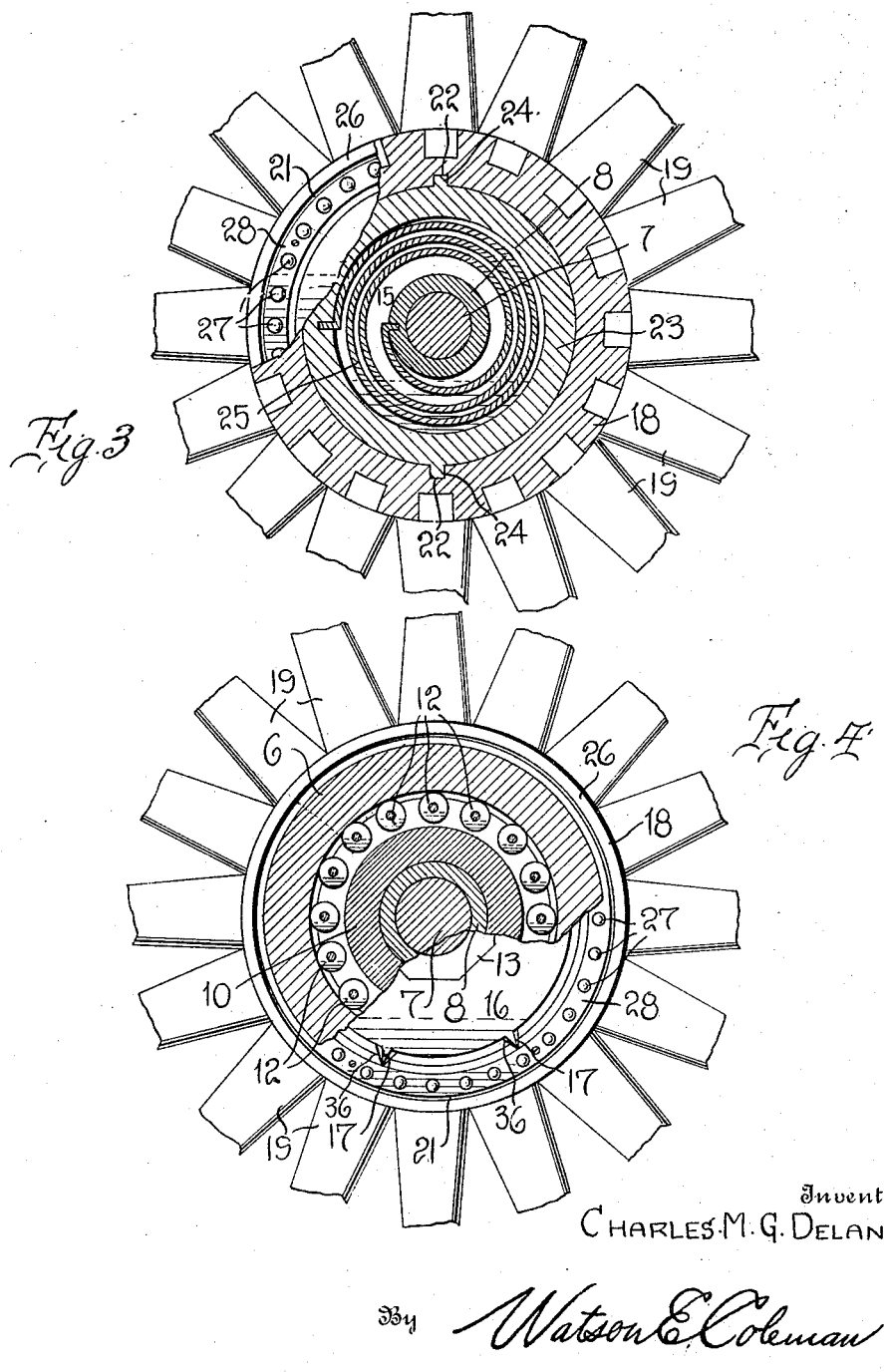

UNITED STATES PATENT OFFICE.

CHARLES M. G. DELANO, OF AUGUSTA, MAINE.

RESILIENT WHEEL.

1,192,045.   Specification of Letters Patent.   Patented July 25, 1916.

Application filed December 13, 1915. Serial No. 66,561.

*To all whom it may concern:*

Be it known that I, CHARLES M. G. DELANO, a citizen of the United States, residing at Augusta, in the county of Kennebec and State of Maine, have invented certain new and useful Improvements in Resilient Wheels, of which the following is a specification, reference being had to the accompanying drawings.

This invention relates to resilient wheels and more particularly to a wheel of that type wherein the cushioning means is arranged in the wheel hub, and it is the primary purpose of the invention to provide an improved mounting and arrangement of the spiral cushioning spring within the wheel hub which will effectively cushion the load of the vehicle and absorb all shocks or jars when the vehicle wheels encounter obstructions or pass over uneven grade surfaces.

It is another important object of the invention to provide means for preventing the entrance of dust or dirt to the interior of the hub, and at the same time enable the several parts to be easily and quickly assembled or disassembled.

Figure 1:
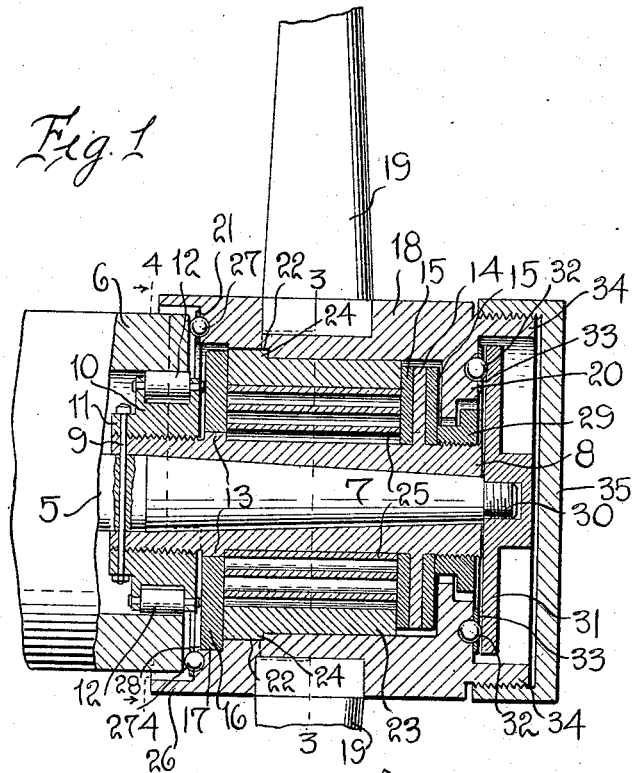
Figure 2:
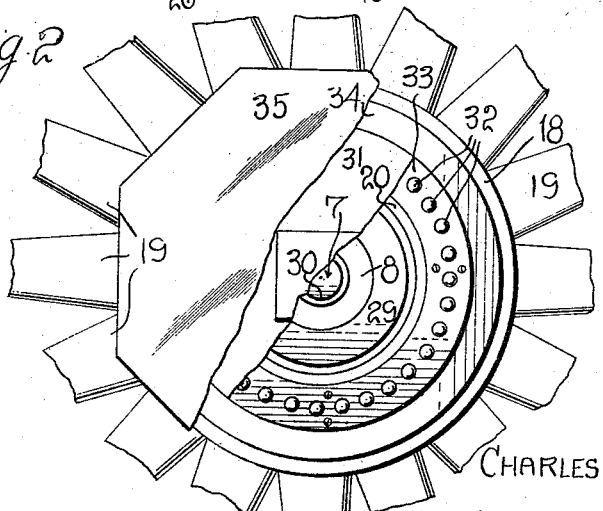

With the above and other objects in view, my invention consists in the novel features of construction, combination and arrangement of parts to be hereinafter more fully described, claimed and illustrated in the accompanying drawings, in which, Figure 1 is a vertical sectional view through the hub of a wheel constructed in accordance with the preferred embodiment of my invention; Fig. 2 is an end elevation thereof, certain of the parts being broken away; Fig. 3 is a section taken on the line 3—3 of Fig. 1 with parts broken away; and Fig. 4 is a section taken on the line 4—4 of Fig. 1, certain of the parts being broken away.

Referring in detail to the drawings, 5 designates the driving axle of an automobile or other vehicle and 6 the casing therefor. The axle 5 is provided with the usual tapering spindle 7 upon which the thimble 8 is engaged and rigidly fixed at its inner end by means of the rod or bolt 9. This inner end of the thimble 8 is exteriorly threaded to receive an annulus or collar 10 which is flanged, as at 11, and provided with openings to receive the opposite ends of the fastening bolt 9. In the collar 10, the spaced anti-friction rollers 12 are mounted for rolling engagement upon the inner wall of the axle casing 6, as clearly shown in Fig. 1. At the inner end of the threaded section of the boxing upon which the collar 10 is engaged, said boxing is formed upon its periphery with a polygonal-shaped shoulder 13, and adjacent to the outer end of said boxing the same is provided with an annular flange 14 upon opposite sides of which the washer plates 15 are engaged. The plate 16 is also engaged upon the shoulder 13 of this axle boxing, and this plate is provided upon its lower edge portion, at spaced points, with the V-shaped lugs or projections 17.

18 designates the wheel hub provided with the usual sockets to receive the inner ends of the spokes 19. This hub is provided at its outer end with the inwardly projecting, annular flange 20 and at its inner end with the annular shoulder 21 surrounding the hub bore. In the wall of the hub bore, at its inner end and at diametrically opposite points, the short longitudinally extending keyways 22 are formed to receive the keys 24 upon the periphery of a sleeve 23 arranged within the hub. This sleeve is disposed between the plate 16 and the inner washer plate 15 mounted upon the axle boxing 8. A spiral spring 25 is arranged within the sleeve 23 and has one of its ends fixed to the wall of said sleeve and its other end suitably secured to the boxing 8. The inner end of the wheel hub is also provided with a longitudinally projecting flange 26 extending over the casing 6 and bearing balls 27 are mounted in the shoulder 21 of the hub and held in place by an annulus 28 secured upon said shoulder.

The outer end of the boxing 8 is threaded to receive a nut 29, the flange 20 of the hub being recessed to accommodate said nut, whereby the nut may be threaded into clamping engagement with the outer washer plate 15 on the axle boxing. The outer end of the axle spindle 7 is reduced and threaded, as shown at 30, to receive the interiorly threaded central boss on a plate or disk 31. Bearing balls 32 are interposed between the face of this disk and the end face of the wheel hub, said balls being held in place by a metal annulus 33 secured to the hub. The outer end of the hub is formed with an outwardly projecting, exteriorly threaded flange 34 to receive the hub cap 35 so that the accumulation of dust and dirt upon the bearings and within the wheel hub is prevented. The hub 18, at the inner end of its bore, is provided with spaced V-shaped recesses 36 to accommodate the correspondingly shaped lugs or projections 17 on the plate 16.

In the operation of the device, it will be understood that, when the vehicle wheel is relieved of the load, the wheel hub and the sleeve 23 will be disposed in concentric relation to the axle. By interposing the spring 25 between the hub sleeve 23 and the axle boxing, the load will be yieldably supported, and when the wheel passes over rocks or obstructions or enters ruts in the road surface, the shock or jar which would otherwise be transmitted to the body of the vehicle, is absorbed by said spring. The lugs 17 on the plate 16, which is fixed upon the axle boxing, prevent circumferential movement of the wheel hub with respect to the axle and thereby prevent undue strain upon the spring 25 and the distortion thereof. It will, of course, be understood that this spring is of a tension in accordance with the character of the vehicle upon which the wheel is used, and will necessarily vary in the application of the invention to various types of pleasure and commercial vehicles. It is, of course, understood that any desired lubricating means may be provided for the several bearings, and owing to the arrangement and mounting of the several elements of the invention, it will be seen that the parts of the device can be easily and quickly assembled upon the wheel axle or disassembled when repairs thereto are necessary. The device is also susceptible of various modifications in the form, proportion and arrangement of the several parts employed and it will, therefore, be understood that I reserve the privilege of adopting all such legitimate changes as may be fairly embodied within the spirit and scope of the invention as claimed.

Having thus fully described my invention, what I desire to claim and secure by Letters Patent is:—

1. The combination with a vehicle axle, of a wheel having a hub, a boxing fixed upon the axle, a sleeve keyed within the bore of the wheel hub, plates mounted upon the axle boxing at opposite ends of said sleeve, said boxing being provided with means co-acting with one of the plates to prevent the relative rotation thereof, said latter plate having means coöperating with the wheel hub to prevent circumferential shifting movement of the same with respect to the axle, and cushioning means arranged within said sleeve to cushion the radial movement of the wheel with respect to the axle.

2. The combination with a vehicle axle, of a wheel having a hub, a boxing fixed upon the axle, a sleeve keyed within the bore of the wheel hub, plates mounted upon the axle boxing at opposite ends of said sleeve, said boxing being provided with means co-acting with one of the plates to prevent the relative rotation thereof, said latter plate having means coöperating with the wheel hub to prevent circumferential shifting movement of the same with respect to the axle, and a spiral leaf spring fixed at one of its ends to the inner wall of said sleeve and at its other end to the axle boxing to cushion the radial movement of said wheel with respect to the axle.

3. The combination with an axle, of a wheel having a hub, a boxing fixed upon the axle, a sleeve keyed within the hub bore, said boxing having a polygonal-shaped shoulder upon its periphery, a plate fitted upon said shoulder and held against rotation thereby, said plate being provided upon its periphery with spaced lugs, the wheel hub having recesses in its inner wall to receive said lugs, whereby the hub is held against circumferential movement with respect to the axle, and cushioning means arranged within the sleeve between the wall thereof and the axle boxing to cushion the radial movement of the wheel with respect to the axle.

4. The combination with an axle, of a wheel having a hub, a boxing fixed upon the axle and provided adjacent one of its ends with an annular flange, washer plates arranged upon opposite sides of said flange, said boxing adjacent its opposite end being formed with a polygonal-shaped shoulder, a plate fitted upon said shoulder and held against rotation thereby, said plate being provided with spaced lugs on its periphery, the wheel hub having recesses in its wall to receive said lugs whereby the hub is held against circumferential movement with respect to the axle, a sleeve keyed within the bore of the hub and disposed between said latter plate and one of the washer plates, and a spiral spring fixed at one of its ends to the inner wall of said sleeve and at its other end to the axle boxing to cushion the radial movement of the wheel with respect to the axle.

5. The combination with a vehicle axle, of a wheel having a hub, a boxing fixed upon the axle provided adjacent one of its ends with an integral flange, a non-rotatable annular plate engaged upon the boxing adjacent its other end and provided with peripheral means coöperatively engaged with the wheel hub to prevent rotation of the latter with respect to the axle boxing, a sleeve disposed between said plate and the flange and provided with means for locking engagement with the wheel hub, and cushioning means permanently fixed to the bore of the sleeve and to the boxing.

6. The combination with a vehicle axle, of a boxing fixed upon the axle, a wheel having a hub, an annular non-rotatable plate mounted upon the axle boxing and provided with means having interlocking engagement with the wall of the hub to prevent rotation of the same with respect to the boxing, a sleeve fitted within the bore of the hub and provided with means on its inner end for locking engagement with the wall of the hub, means on the axle boxing to prevent outward shifting movement of the hub upon said sleeve, and a spiral leaf spring permanently fixed to the bore of said sleeve and to the axle boxing.

In testimony whereof I hereunto affix my signature in the presence of two witnesses.

CHARLES M. G. DELANO.

Witnesses:
A. D. MOUNTFORT,
A. M. DELANO.